United States Patent [19]

Davis

[11] 4,122,703
[45] Oct. 31, 1978

[54] METHOD AND APPARATUS FOR REELING DISCRETE YARN STRAND PATTERNS

[76] Inventor: Jesse B. Davis, 8 Sagamore Hill Dr., Port Washington, N.Y. 11050

[21] Appl. No.: 744,527

[22] Filed: Nov. 24, 1976

[51] Int. Cl.² .............................................. G01B 13/04
[52] U.S. Cl. ........................................ 73/37.7; 73/160
[58] Field of Search ................. 73/37.7, 37, 37.5, 160

[56] References Cited

U.S. PATENT DOCUMENTS

| | | | |
|---|---|---|---|
| 2,407,100 | 9/1946 | Richardson | 73/37.7 X |
| 2,560,833 | 7/1951 | Mennesson | 73/37.7 |
| 2,843,822 | 7/1958 | Lewis et al. | 73/37.7 X |
| 3,271,997 | 9/1966 | Horne et al. | 73/37.7 |
| 3,283,564 | 11/1966 | Biddison, Jr. | 73/37.7 |
| 3,411,352 | 11/1968 | Stoller | 73/37.7 X |
| 3,435,673 | 4/1969 | Felix | 73/37.7 X |
| 3,667,282 | 6/1972 | Czwakiel et al. | 73/37.7 |
| 3,885,417 | 5/1975 | Stern | 73/37.7 |

Primary Examiner—Richard C. Queisser
Assistant Examiner—Joseph W. Roskos
Attorney, Agent, or Firm—Robert B. Burns

[57] ABSTRACT

Method and apparatus for continuously monitoring a moving yarn line to detect the presence of undesired denier imperfections. The yarn is passed through an elongated constricted passage sensing device into which a sensing fluid is concurrently fed. The back pressure thus created in the fluid carrying line due to flow resistance in the sensing device, is monitored to detect variations which would indicate an imperfection in the moving yarn line.

7 Claims, 2 Drawing Figures

METHOD AND APPARATUS FOR REELING DISCRETE YARN STRAND PATTERNS

BACKGROUND OF THE INVENTION

The transferring of fibers or other flexible filamentary material from a cocoon, spinneret, extrusioned eye, spinning frame or the like, onto a spool, a reel or a similar holding receptacle in a particular pattern is the basic step in the formation or processing of a yarn.

As hereinafter used and referred to, a single yarn is the simplest strand of material suitable for weaving or knitting, which if untwisted, will separate into the individual fibers from which it was made. Also, the international denier as herein used is defined as a skein of yarn 450 meters long which weighs 0.05 grams. For manmade yarn 20 × 450 or 9,000 meters of a 1 denier yarn weighs 1 gram. 9,000 meters of 2 denier yarn weighs 2 grams.

The composition of any yarn must be of a character in accordance with the type or form of fabric into which the yarn is to be woven. A tightly woven fabric, for example, can be made from a single strand of a filament or single ply. In some instances a yarn is desired, wherein in other instances a plied or folded yarn made up of two or more single yarns is required.

In certain other instances commingled yarns comprising 2 or more natural or manmade fibers in varying percentages, are desired to achieve a specific character of the finished textile product. Once the specific fibers are selected the proper yarn denier and texture should be maintained to assure that there will be the desired uniformity of character in the subsequently woven or knitted product.

In any instance, when the desired yarn composition and/or denier is interrupted during a machine processing step, it becomes necessary to stop the equipment, make the necessary corrections, and then proceed with the operation.

In an exemplary situation a spool or package of feeder yarn can be required to hold a continuous, single yarn of a specific denier or weight per unit length. However, during the high speed transfer to a wind-up reel, a second strand from an adjacent location can inadvertently become intermeshed therewith such that both strands are then drawn together onto the wind-up reel. Thereafter, unless immediate detection is made of this malfunction, and corrected, the desired single yarn pattern might continue uncorrected.

Such a defect in the wound yarn spool will become pertinent during a later unreeling for the next processing operation, or for the final knitting or weaving operation. At the latter, the necessary changes and corrections to material and equipment can be both expensive and time consuming.

A further persistent and recurring problem is the breaking of a yarn strand at any point in its processing. A skilled operator in such an instance must detect the yarn break and rapidly splice the broken ends with a minimum amount of loss of time. A weaver's knot or splice when correctly made in the broken segments, can have a diameter up to 6 to 8 times the diameter of the yarn. This knot or splice must of course pass freely through any monitoring device interposed along the path of the moving yarn without breaking the yarn at the splice.

Toward overcoming these persistent and recurring problems, the presently disclosed apparatus and method of use includes means to continuously monitor and detect denier variation in a yarn processing operation to maintain a degree of yarn uniformity and quality. Detection takes the form of an elongated, constricted passage means through which a yarn line passes. Functionally, the apparatus will instantaneously determine when a desired yarn composition or pattern is interrupted by the addition to, loss of, or change in one or more strands. The detection means further triggers the necessary ancillary circuitry to provide a signal to indicate or record the presence or location of the defect, or to stop the operating equipment in a manner that needed corrections can be made. For example, the signal can be utilized to initiate a cutter apparatus to excise the defective yarn, make a splice, and then continue the operation.

The diameter and length of the constricted passage thus constitutes a reaction to a flow of a sensing fluid which is introduced to the passage along with the yarn. To conserve the supply of the regulated sensing fluid, air for example, the sensing unit should offer a high impedance to the fluid flow. An aspect ratio relating to passage length to passage diameter, should be on the order of magnitude of 400 to 1. With a strand of yarn passing through such a constricted passage, impedance rises greatly. A primary purpose of the disclosed apparatus therefore is to detect and indicate a broken end or a strand break. Further, to detect passage of two strands when only one is desired, or detect the absence of a strand when two or more are desired to be in the yarn structure.

By carefully balancing the volume and pressure of the sensing fluid the disclosed apparatus functions with considerable versatility. For example it functions to monitor the homogeneity of twisted, crimped, and commingled textured yarns which are treated to give the yarns resilience, stretchability, bulk, and liveliness. These characteristics of course increase the salability and desirability of yarns to a purchaser.

It should be noted that a yarn which has been crimped, oiled, and textured to cause the fibers to more readily entangle with each other, exhibits an increase in bulk of 200 to 300% over an untextured filament of the same denier. If this bulkiness of textured yarn is uniform such yarn can occupy the entire volume of the elongated sensing passage, its commingled fibers would understandably offer a throttling effect upon the sensing fluid.

If the required tension maintained upon a textured yarn is applied within controlled limits, the hereinafter disclosed apparatus can be arranged to detect an extremely small pneumatic input signal. It will further convert the signal to a fluid flow circuit, and amplify the flow by means of modulation. The resultant output can then be used to control and regulate a pneumatic or electrically controlled device.

To illustrate the invention, the following description of the disclosed apparatus and method therefor are directed to the use of a single yarn as being the desired embodiment. It can be appreciated nonetheless that the disclosed method can be directed as well to the provision of plied yarns, blended or commingled yarns, and yarns having a particularly desired texture. Further, it is within the ambit of the invention that the process can be applied to filamentary products other than yarns for carpets, curtains, and wearing apparel, including certain forms of rope, wire, cable, twine, thread, or similar flexible products adapted to be wound onto a spool or a reel.

An object of the invention therefore is to provide a method and apparatus for continuously monitoring a yarn line for the purpose of detecting a malfunction or defects in the yarn processing operation. A further object is to provide a novel detection system for continuously monitoring a rapidly moving yarn line to assure the maintenance of the uniformity and quality of the product. A still further object is to provide means to instantaneously detect a break in a moving yarn line during a processing step.

DESCRIPTION OF THE DRAWINGS

In the drawings;

Referring to FIG. 1, the novel apparatus is shown as comprising holding means 10 such as a reel or the like for restraining the desired material, such as a single yarn. Thus, holding means 10 can take the form of a spinneret, a bobbin, or a take-up roll in the early stage of yarn formation. It can also include a storage creel for holding feed yarn prior to subsequent ply twisting, texturing or commingling operations.

Figure 1:
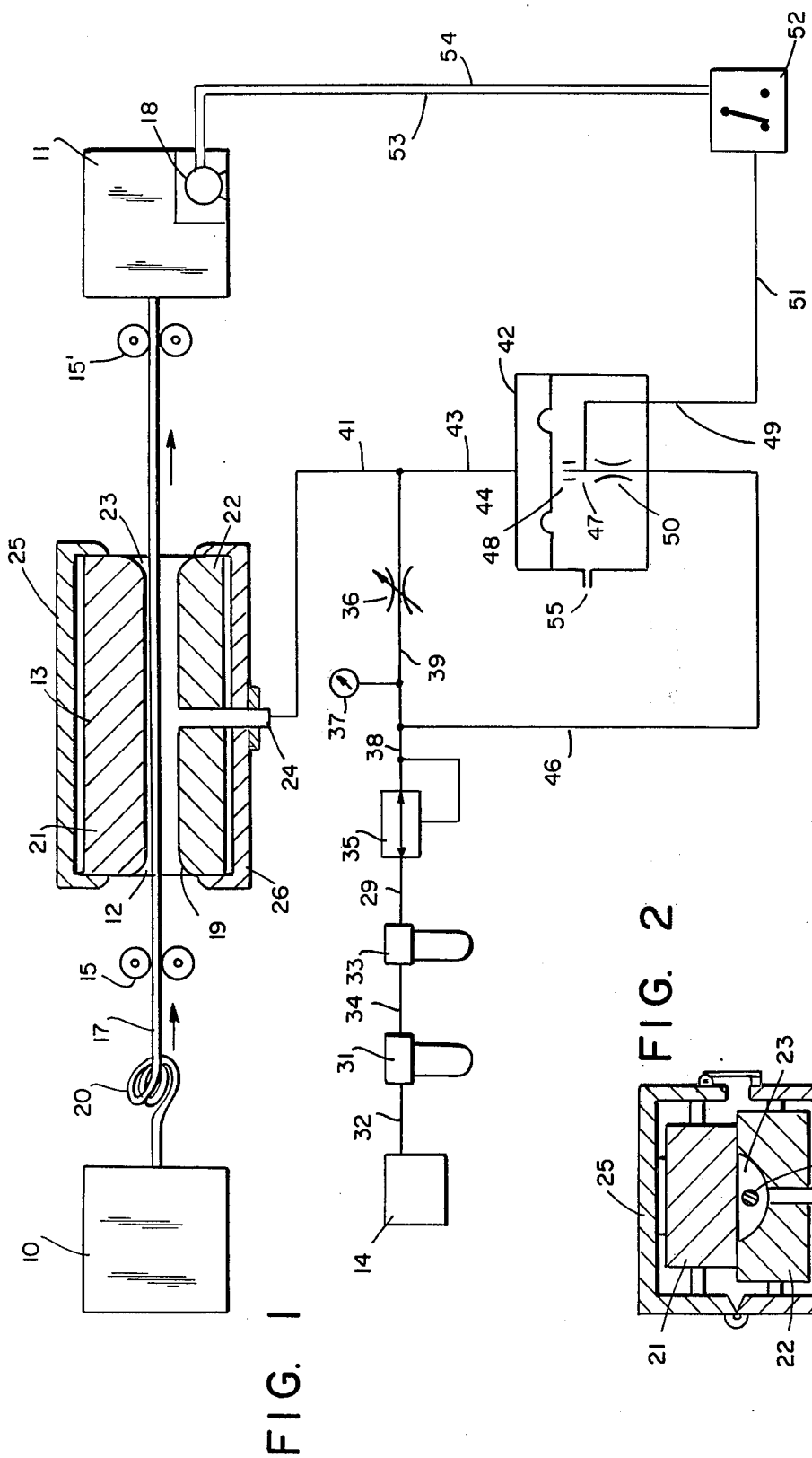
FIG. 1 is a schematic representation of the instant monitoring system, shown in conjunction with a yarn processing apparatus.

A wind-up reel or spool 11 is represented as being driven at a controlled speed commensurate with the character of the yarn being processed. Said speed is normally governed by suitable automatic drive and control means known in the industry. A single strand, or yarn line 17 is shown stretched between the two members 10 and 11, which strand is normally controlled by a series of guides, drive rolls and wind-up tension controls 15 and 15'.

It is desirable that monitoring devices be used on many types of existing yarn manufacturing apparatus to serve as a quality control and stop motion devices.

Hence the monitoring means 13 is disposed at the most convenient and effective location intermediate the respective holding means 10, and wind-up means 11, best suited for the process step and the specific machinery employed. Said monitoring means comprises in essence a unit through which the rapidly moving yarn line or strand 17 passes while being drawn onto a wind-up 11. Monitoring unit 13 forms basically a single, straight, elongated sensor passage 12 having opposed open ends, and having inlet means communicated therewith for introducing a stream of sensing fluid to the passage.

The defect detection phase of the apparatus is illustrated as comprising a source of a sensing fluid 14. The latter serves to introduce a closely controlled stream of a sensing fluid into the monitoring apparatus 13, whereby to establish a back pressure. In the latter the volume, or the pressure exhibited by sensing fluid is continuously detected. Any flow or pressure variation noted in passage 12 is indicative of a defect, break or malformation in the desired yarn line 17.

The detection means further includes the necessary circuitry for controlling or regulating the drive means 18. The latter is so connected with wind-up reel 11, and holding means 10, such that the entire operation or process can be controllably slowed, or completely and suddenly stopped as needed through a stop motion arrangement.

Figure 2:
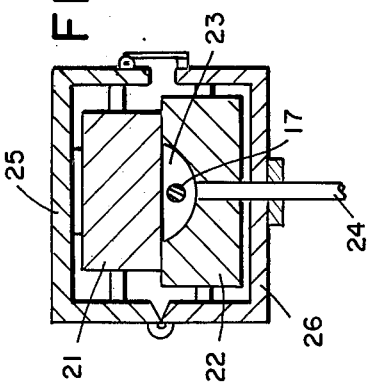
FIG. 2 is a sectional view taken along lines 2—2 of FIG. 1.

Referring to FIGS. 1 and 2, yarn monitoring apparatus 13 as noted, embodies an elongated, straight, smooth walled sensor passage 12. Said passage is formed of a material capable of resisting the abrasive action caused by a rough, or even a smooth surfaced line yarn 17 rapidly running therethrough. Since this yarn can be drawn at speeds of from several hundred, to several thousand feet per minute, it is appreciated that the abrasive effect of some material would in a relatively short period of time wear away the walls of passage 12.

Inlet end 19 to sensor passage 12, is provided with a smooth walled convergent opening. This terminates adjacent to the passage entrance to facilitate introduction of the yarn 17 to the sensor passage proper. Passage 12 can be shaped of a single member with a borehole therein. Preferably however it is formed of at least two or more cooperating members 21 and 22. At least one of said cooperating members 21 and 22 can include a groove or similar elongated depression such that when closed about a segment of the yarn 17, the cooperating members form an elongated annular passage or chamber 23 for directing sensing fluid flow.

The cross sectional area of annular passage or chamber 23 is contingent on the diameter of the yarn line 17 being passed therethrough, and is preferably constant along its length. In the present instance the open area of passage 23 is of sufficient size to accommodate more than a single strand of taut yarn 17. However, since as noted the single yarn being wound onto wind-up reel 11 consists of but a single strand of yarn, the presence of a second strand of yarn within sensor passage 23 will cause the detection apparatus to be actuated. Since yarn line 17 will on occasion have a knot 20 therein due to broken ends being tied, the open area of passage 12 should be sufficient to freely pass the knot without again breaking the line. Thus, the ratio of length of passage 12 to diameter thereof when a circular configuration is utilized, can be about 400 to 1. This ratio would of course be variable depending upon the type of yarn being detected.

In one embodiment, cylindrical sensor passage 12 is preferably formed of a highly abrasion resistant material such as aluminum oxide, tungsten carbide or the like. Such material is of course capable of being formed or machined to exhibit a relatively smooth surface. The primary function of sensor passage 12 resides in guiding the stream of sensing fluid which flows through said passage 23 to either or both ends thereof. The walls of said passage 12 therefore should be capable of maintaining a high degree of smoothness over an extended operating period.

As shown in FIG. 2, sensor passage 12 is formed by a semicircular cross sectional groove cut or formed into member 22 to define a wall of the passage 12. The passage other wall is comprised of the flat side of member 21 which is firmly held against memmber 22. The common contacting surfaces between said members should be flat and smooth to assure the air tight integrity of sensor passage 12. Thus, any air or sensing fluid in said passage, will leave only through the opposed ends of the elongated sleeve thereby formed.

To permit a degree of versatility, and to facilitate replacement of parts, members 21 and 22 are positioned within a quick acting holder. In one embodiment, the latter includes a pair of operably connected elements 25 and 26 having a central cavity therein. Adjustable spacers disposed within the central cavity, position and retain the respective sensor passage members 21 and 22 in place.

With such an arrangement, members 21 or 22 can be readily replaced due to wear, or realigned to a change in the denier of yarn being processed. Further, the holder arrangement permits an operator to gain quick access to the holder's interior. Thus, when yarn strand 17 breaks, or is detected as carrying a greater or lesser number of yarns than is required, holder 26 can be quickly opened and closed to provide access to sensor passage 23.

One or more transverse passages 24 are formed into the wall of holder 26, terminating at, and in communication with sensor passage 12. Such location is preferably central of passage 12, and permits the introduction of a stream of sensing fluid to the latter. The sensing fluid will then, as noted, flow from one or both ends of the open ended passage 12.

Normally, the sensing fluid utilized is a gaseous material. Preferably, clean filtered air at a controlled temperature and pressure serves the purpose.

The two halves of the split holder 26 which position sensing passage members 21 and 22, are conveniently hinged along one side to facilitate opening and closing. Means 27 is further provided on holder 26 to maintain a closed, sealed relationship about the segment of the moving yarn strand 17 therein. As presently shown, sensor passage 12 is characterized as embodying a semi-circular cross sectional configuration normal to the longitudinal axis. It is appreciated however that other configurations would be applicable to the instant use. For example, a round, oval, or similar shape can be utilized for receiving one or more moving yarn strands as the case may be, and yet functioning to permit a flow of sensing fluid along annular passage 23, defined between yarn 17 and the walls of passage 12.

Strand monitoring apparatus 13 incorporates a rapidly acting and sensitive detection means. The latter as noted embodies the capability of instantaneously determining when more than one yarn line 17 or when a different size of yarn is drawn into sensor passage 12.

In brief, the essence of the presently disclosed method hinges primarily on the continuous measurement of a fluid back pressure. The latter is in turn dependent on the fluid resistance exhibited by a dynamic annular passage or chamber 23, as defined by the peripheral walls of passage 12 and the outer diameter of yarn line segment 17. The sensing of a discrete back pressure which deviates from a predetermined norm, will initiate a signal as the first step in a sequence of operations designed to correct the particular condition within chamber 23.

Therefore, while a particular sensing chamber and arrangement has been described herein, the subsequent signal establishing circuit can embody any of several pneumatic or fluidic circuits adapted to the instant purpose. To illustrate the operation of the method and the apparatus therefor, the following fluid circuit is provided.

Compressed air from a source 14 such as a compressor or container, is passed through line 32 to a filter 31. From the latter, filtered air is passed to oil separator 33 by way of line 34, thence by line 29 to pressure regulator 35. The downstream side of pressure regulator 35 is connected with the inlet of a variable restrictor 36, such as an adjustable needle valve. This connection is made by way of pressure gauge 37 through lines 38 and 39 respectively. The downstream or outlet side of the variable restrictor 36 is communicated directly with sensing passage 12 by way of line 41. Thus, the judicious regulation of needle valve 36 is closely controlled and a constant stream or flow of air is introduced into sensing passage 12. Further, this occurs concurrently with the passage of rapidly moving yarn line 17. The volume and pressure of sensing fluid or air, are of necessity regulated to utilize as little as is economically possible. It is done however realizing maximum sensitivity of the variable back pressure that will be experienced in annular chamber 23 and in line 41.

Sensing of the back pressure created in chamber 23 is achieved primarily by a diaphragm amplifier 42. Said amplifier is communicated through line 43 with line 41. Thus, an input signal or fluid back pressure is transmitted to the input side of amplifier 42 whereby to act against diaphragm 44 and monitor the magnitude of back pressure variations which occur.

Line 46 further communicates the control side of amplifier 42 with the upstream side of needle valve 36. Thus, a constant pressure air flow having an order of magnitude of about 15 psi, is passed through metering orifice 50 and thence outward past passage 47. The air stream then proceeds through nozzle 48 until the air is vented to the atmosphere through vent opening 55.

When a back or actuation pressure increase is sensed within line 41, it will be applied to diaphragm 44, thus displacing the latter to block nozzle 48. This action closes the passage of vented air to the atmosphere, causing the pressure to increase in output passage 47, thereby providing an amplified output signal at the amplifier output 49.

The amplified output signal in the form of a higher air pressure, is passed by conduit 51 to the inlet of pressure switch 52. Functionally, the latter in the off position, maintains a closed electrical circuit through line connections 53 and 54 which conduct power to motor 18. The pressure increase, when fed into switch 52, causes the latter to be actuated, thereby interrupting power to motor 18.

Operationally, to grade or monitor a yarn line it is necessary to establish a standard or norm against which the instant system will function. Thus, a yarn line of the desired grade and bulk will run through sensing passage 12. As previously noted, the passage is so formed to provide a length to cross sectional area ratio that will permit the desired sensitivity for establishing a dynamic back pressure.

With a constant tension applied to yarn line 17 by way of tensioner 15 and 15', the flow of sensing medium will commence. The pressure of said medium is controlled at regulator 35 and the volume flow, by adjustment of needle valve 36. Air flow from regulator 35 is concurrently applied to one side of diaphragm 44 of diaphragm amplifier 42.

When as herein mentioned the yarn to be graded maintains a desired consistency, the condition of the monitoring means will remain static. Thus, so long as a single yarn line with a constant bulk passes through sensing passage 12, the yarn grading system will maintain an undisturbed operation.

When, however, another yarn line, or a strand becomes intermingled with the first yarn line 17, the cross sectional area of passage 23 will be commensurably decreased. The resulting increase in fluid resistance along yarn line 17 will create a greater than usual fluid back pressure within passage 12 and line 41.

This change in fluid back pressure will register against diaphragm 44 of amplifier 41, thereby deflecting the diaphragm into engagement with nozzle 48. The resulting signal generated at the output 49 of amplifier 42 can then be used for instituting any of several reactions.

As previously noted, the generated signal could be arranged to cut off power to motor 18. Alternately, it could merely activate a recording mechanism which would permit the defects in line 17 to be noted such that the defects could be catalogued and later isolated on a particular wind-up or reel.

While the instant detection system as described is adapted to react to an increase in fluid back pressure, it can further incorporate the feature of reacting to a break in the yarn line 17. Such a contingency would be indicated by a sudden decrease in back pressure within sensing passage 12 in response to the decrease in fluid flow resistance within said passage.

In brief, the detection circuit could be readily revised or modified to incorporate means to react to a variety of circumstances which might arise regarding yarn line 17. Further, said system could be adjusted to react within predetermined ranges of pressures to properly grade and monitor the yarn line. Still further, said system can be adapted to react only to a steady, or a consistent back pressure variation rather than to a pulsed pressure as would be caused by the passage of a weaver's knot 20 or similar temporary defect in line 17 through passage 12.

I claim:

1. Yarn grading apparatus for monitoring a moving yarn line comprising one or more discrete strands to assure the denier consistency thereof, the apparatus including:

means forming an elongated sensing passage of sufficient cross sectional opening to closely surround a segment of said moving yarn line, whereby to define an elongated annular chamber between said yarn line and the walls of said sensing passage when said line segment is registered within said elongated sensing passage, said means forming a sensing passage including a holder comprising elongated upper and lower members being pivotally engaged along a mutual edge thereof to permit pivotal movement of the respective members between open and closed positions, each of said upper and lower members having a cavity therein disposed in contiguous relationship when said respective members are in the closed position, passage defining inserts (21 and 22) removably positioned within the respective cavities whereby to define said elongated sensing passage about said yarn line when the holder is in the closed position, a source of sensing fluid including at least one conduit communicating said sensing fluid source with said elongated annular chamber to introduce a controlled flow of sensing fluid to the latter, whereby to establish a fluid back pressure within said at least one conduit and said annular chamber as a result of the fluid flow resistance characteristics exhibited by said annular chamber, and monitoring means communicated with said at least one conduit, being sensitive to the occurrence of variations in the magnitude of the said fluid back pressure, which occur in response to a change in fluid flow resistance within said annular chamber.

2. The apparatus as defined in claim 1, wherein said passage defining inserts (21 and 22) are formed of an abrasion resistant material.

3. The apparatus as defined in claim 2, wherein said sensing passage defined by said passage defining inserts extends substantially the longitudinal length of said holder.

4. The apparatus as defined in claim 1, wherein the ratio of said sensing passage length, to the cross sectional area thereof normal to said passage length, is approximately 400 to 1.

5. The apparatus as defined in claim 1, wherein said passage defining inserts (21 and 22) are formed of aluminum oxide.

6. The apparatus as defined in claim 1, wherein said passage defining inserts (21 and 22) are formed of tungsten carbide.

7. The apparatus as defined in claim 2, wherein said passage defining inserts are formed of a plurality of said members removably positioned within a common holder cavity whereby to define a curved wall of said elongated sensing passage.

* * * * *